United States Patent

[11] 3,566,036

[72] Inventors Austin O. Roche
Winter Park, Fla.;
Myron H. Nichols, La Jolla, Calif.; Parker Painter, Jr., Winter Park, Fla.

[21] Appl. No. 424,042
[22] Filed Jan. 7, 1965
[45] Patented Feb. 23, 1971
[73] Assignee General Dynamics Corporation

[54] SYNCHRONOUS DOUBLE SIDEBAND SUPPRESSED CARRIER MULTICHANNEL SYSTEM
15 Claims, 9 Drawing Figs.

[52] U.S. Cl. .......... 179/15, 325/49, 325/50, 343/200, 325/63
[51] Int. Cl. .......... H04j 1/06, H04b 1/68
[50] Field of Search .......... 179/15 (R), 15 (FS), 15 (BP); 325/49, 50, 56, 62, 63, 65, 163, 329, 416, 418, 419; 343/200, 203

[56] References Cited

UNITED STATES PATENTS

| | | | |
|---|---|---|---|
| 2,733,296 | 1/1956 | Maggio | 179/15 |
| 3,364,311 | 1/1968 | Webb(Parker) | 179/15 |
| 2,871,295 | 1/1959 | Stachiewicz | 325/49 |
| 3,068,416 | 12/1962 | Meyer | 325/63X |
| 3,196,352 | 7/1965 | Hopner et al. | 325/49 |
| 3,218,557 | 11/1965 | Sanders | 325/419X |
| 3,271,679 | 9/1966 | Fostoff | 325/62X |
| 3,289,082 | 11/1966 | Shumate | 325/30 |

*Primary Examiner*—Robert L. Griffin
*Assistant Examiner*—Benedict V. Safourek
*Attorney*—B. B. Olive

ABSTRACT: A multichannel telemetry system using double sideband suppressed carrier amplitude modulated signals is described. The transmitted suppressed carrier signal also contains a reference signal component which is on continuously notwithstanding that the information or data signal to be transmitted is discontinuous. At the receiving terminal, the entire composite signal is used to synthesize the carrier. The reference signal is extracted from the composite signal and also used to control the amplitude and phase of the received composite signal and the synthesized carrier, respectively.

FIG. 8

INVENTORS
Austin O. Roche
Myron H. Nichols
BY Parker Painter, Jr.
ATTORNEY

INVENTORS
Austin O. Roche
Myron H. Nichols
BY Parker Painter, Jr.

ATTORNEY

INVENTORS
Austin O. Roche
Myron H. Nichols
Parker Painter, Jr.
BY
B. B. Olive
ATTORNEY INVENTORS
Austin O. Roche
Myron H. Nichols
Parker Painter, Jr.

BY B. B. Olive
ATTORNEY

SYNCHRONOUS DOUBLE SIDEBAND SUPPRESSED CARRIER MULTICHANNEL SYSTEM

This invention is generally concerned with telemetry systems and more particularly with a multichannel system utilizing double-sideband, suppressed-carrier, amplitude-modulated subcarriers arranged in the form of a frequency-division multiplex.

Double-sideband, amplitude-modulated, suppressed-carrier, single-channel and multichannel telemetry techniques have been previously applied for data and information transmission over various kinds of links including long-distance telephone and radio links. The basic principles and advantages of such techniques are well understood in the art. In prior art systems, however, modulation takes place only when there is input data. Consequently, the modulating processes at the transmitting end and the demodulating processes at the receiving end are operational only when data is being received and transmitted. Stated differently, conventional techniques in the system referred to are based upon the data signal being the sole modulating signal. Thus, when the data signal is absent, there is no operational modulation or demodulation.

In the present invention, it has been discovered that multichannel telemetry using double-sideband, suppressed-carrier, amplitude-modulated subcarrier techniques can be much improved and new system characteristics realized by applying to the modulator at the transmitting end both the data signal and a locally generated constant frequency reference signal and at the receiving end, recovering both the data and reference signal and using the reference signal as a means to restore both the original or some predetermined level of the data signal and the original phase of the data signal.

An object of the present invention is, therefore, to provide an improved multichannel telemetry system employing double-sideband, suppressed-carrier, amplitude-modulated subcarrier techniques.

A further object of the invention is to provide in a multichannel double-sideband, suppressed-carrier, amplitude-modulated subcarrier telemetry system, a continuously operative modulating signal, independent of the data signal, and which can be recovered at the receiving terminal as a means of providing a continuously operative demodulation carrier reference.

Another object of the invention is to provide for vibration telemetry a system exhibiting data quality improvements in the fidelity of the power spectral density, amplitude probability distribution, reproduction of waveform time histories and cross spectral density.

Another object of the invention is to provide for vibration telemetry a system which makes maximum utilization of the statistical properties which occur in wideband vibration and acoustical data in order to achieve highly efficient radio frequency communication.

Another object is to provide in a multichannel double-sideband, suppressed-carrier, amplitude-modulated subcarrier telemetry system a means for resolving the polarity ambiguity of the demodulated data.

Another object is to provide in a multichannel, double-sideband, suppressed-carrier, amplitude-modulated, subcarrier telemetry system means for full end-to-end amplitude level calibration of each data channel.

The foregoing and other objects will appear from the description and drawings to follow, in which.

Figure 1:
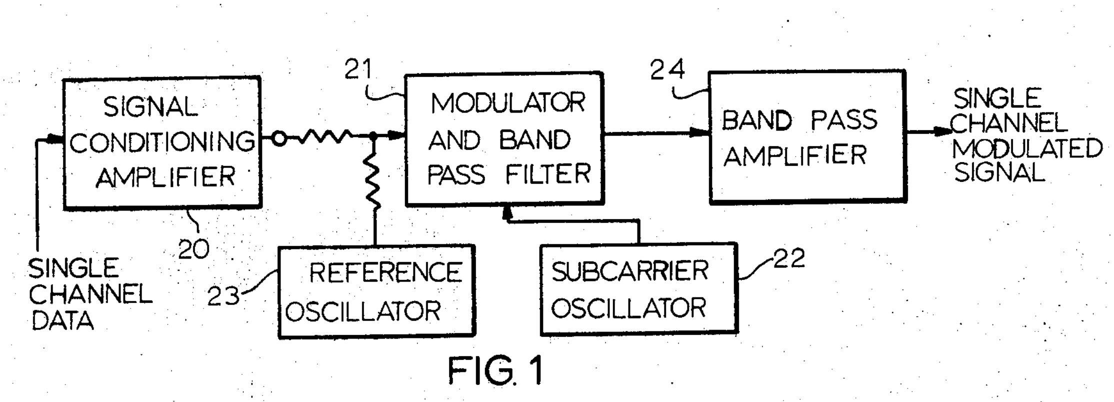
FIG. 1 is a block diagram of a single data channel at the transmitting terminal.

As previously mentioned, the telemetry system of the invention is directed to a double-sideband, suppressed-carrier, amplitude-modulated subcarrier type arranged as a frequency-division multiplex. The basic transmitting circuit elements employed for modulating the individual channel are first described in connection with FIG. 1 in which 20 represents appropriate signal-conditioning amplifying circuitry into which the data is fed. The signal-conditioning amplifying circuitry 20 is optional since the source and condition of the signal will vary. The data itself may be acquired directly from a transducer terminal, for example, or before entering the circuitry of FIG. 1 the data may have been subjected to some form of preprocessing operation such as amplification and filtering, sampling, quantization into discrete signal form, or conversion to pulse amplitude, pulse-position, or pulse-duration form. The data and its form and source will of course vary with the application of the invention. Typical process or control data collection, for example, is found in ground installations, aircraft, missiles, rockets, shipboard, marine craft and oceangraphic stations. The invention is particularly useful in telemetering wide-band data such as rocket airframe vibration and engine chamber fluctuations.

After being conditioned and amplified as required, the data is employed as a modulating signal and is fed to a modulator and band-pass filter network 21 into which is also fed the output of the particular channel's subcarrier oscillator 22. Unlike conventional practice, it is of particular importance to recognize that an additional modulating signal is provided by a continuously operative reference oscillator 23 whose output combines with the output of the data signal conditioning amplifier 20. Thus, modulation is continuous with respect to the modulating effect of the reference carrier signal and discontinuous insofar as the data signal is discontinuous. In any event, there is always a modulating effect present because of the locally generated reference signal, irrespective of the presence of data input. Much of the invention centers around this locally generated reference signal, its recovery and its employment for various purposes, all of which is later discussed. It should particularly be noted that frequency stability of the subcarrier oscillator such as oscillator 22 is not critical. As will be appreciated from the later discussion, the reference oscillator 23 should however be highly reliable and highly regulated. The frequency of oscillator 23 should also be selected to be higher than the highest expected or introduced frequency of the data signal spectrum.

Considering further FIG. 1 and the transmitting elements of a single channel, the modulating signal leaving the modulator and band-pass filter 21 is fed to a band-pass amplifier 24 whose pass-band center is tuned to the subcarrier frequency and in which higher-order signal components produced by the modulator are suppressed. The output of band-pass amplifier 24 is a signal bearing the modulating effects both of the data signal itself as well as the reference signal produced by reference oscillator 23.

Figure 2:
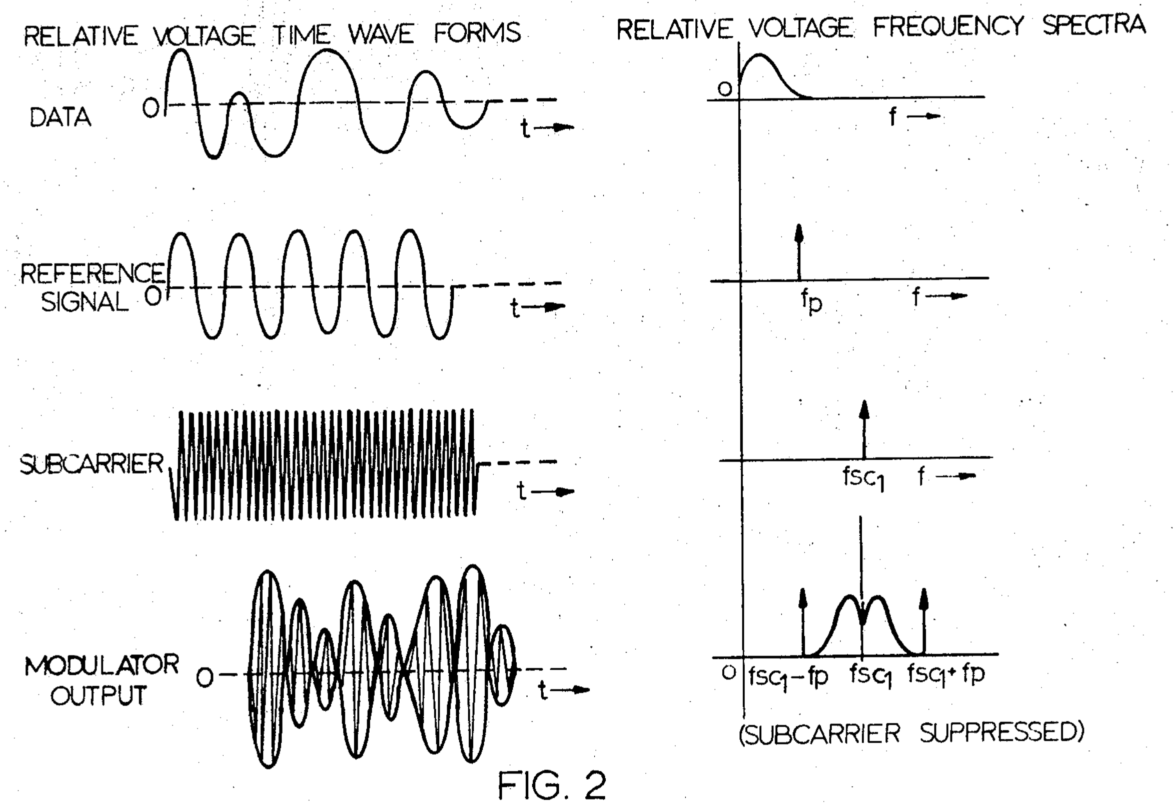
FIG. 2 illustrates typical general voltage-time waveforms and voltage-frequency spectra for a single channel.

Generalized voltage-time waveforms and voltage-frequency spectra for a single channel are illustrated in FIG. 2 where an arbitrary data-signal voltage waveform as might be fed to signal-conditioning amplifier 20 is indicated as developing a varying-frequency voltage spectrum one side of which is shown in reference to a zero-frequency reference axis. Also shown in FIG. 2 are a representative reference signal, designated $f_p$, a representative subcarrier, designated $f_{sc1}$ for a representative channel 1, and a representative modulator output.

Figure 3:
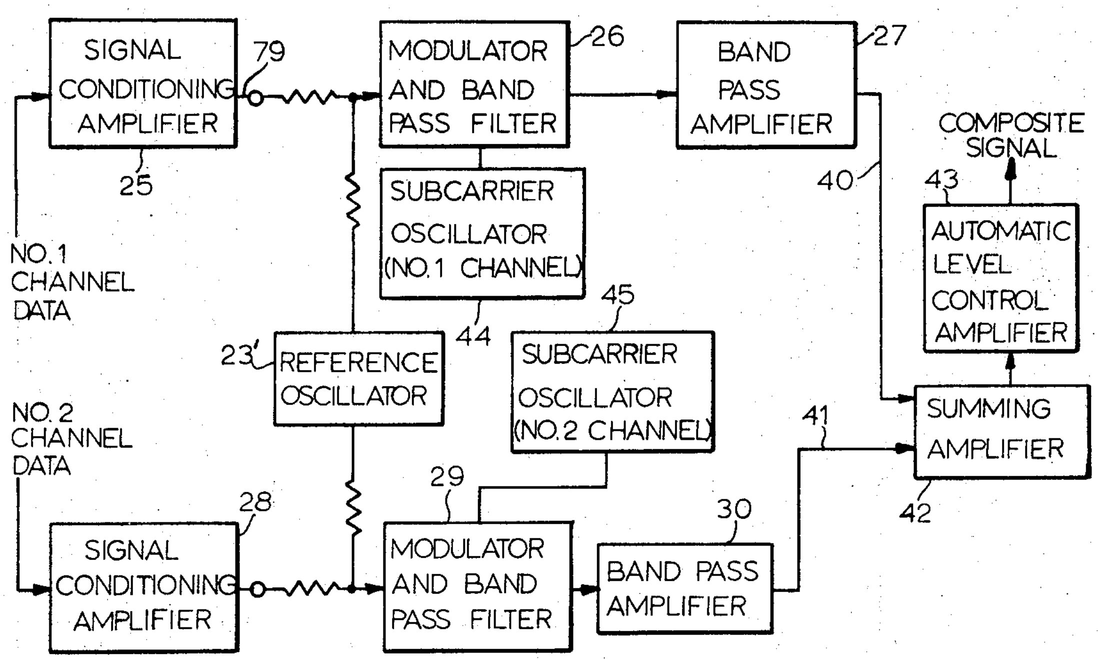
FIG. 3 is a block diagram showing two of the single transmitting channels combined.

Continuing the description with reference to FIG. 3, a system of two channels is used as an example though it should be understood that except for limitations of weight, space and power requirements, almost any number of channels can be multiplexed into a communication system following the invention. A 10-channel system, for example, may employ the invention. In FIG. 3, it will be noted that the circuitry of FIG. 1 is duplicated for each of two channels designated No. 1 Channel and No. 2 Channel, except it will be noted that a single reference oscillator 23′ serves both channels. Comparing FIGS. 1 and 3 further, it will be noted that Channel 1 includes a signal-conditioning amplifier 25, a modulator and band-pass filter 26 and a band-pass amplifier 27, whereas Channel 2 includes a similar signal-conditioning amplifier 28, a modulator and band-pass filter 29 and a band-pass amplifier 30. As previously noted the signal-conditioning amplifiers may not be required in either channel.

The modulated outputs of the two channels are fed through the respective outputs 40, 41 to a summing amplifier 42 and then to an automatic level control amplifier 43. The automatic level control amplifier 43 senses its own output level and maintains such level constant. More specifically, it provides level control of the composite modulated signal ultimately leaving the automatic-level-control-amplifier 43 such that the root-mean-square value of the composite modulation when applied to a transmission system will remain constant for nominal variations in input data amplitudes and will be maintained at the maximum level permitted for full radiofrequency carrier deviation in the case of FM carrier transmission. As later more fully explained the degree of automatic level control is sensed in the demodulation system of each channel and used to provide inverse gain control for each channel.

Figure 4:
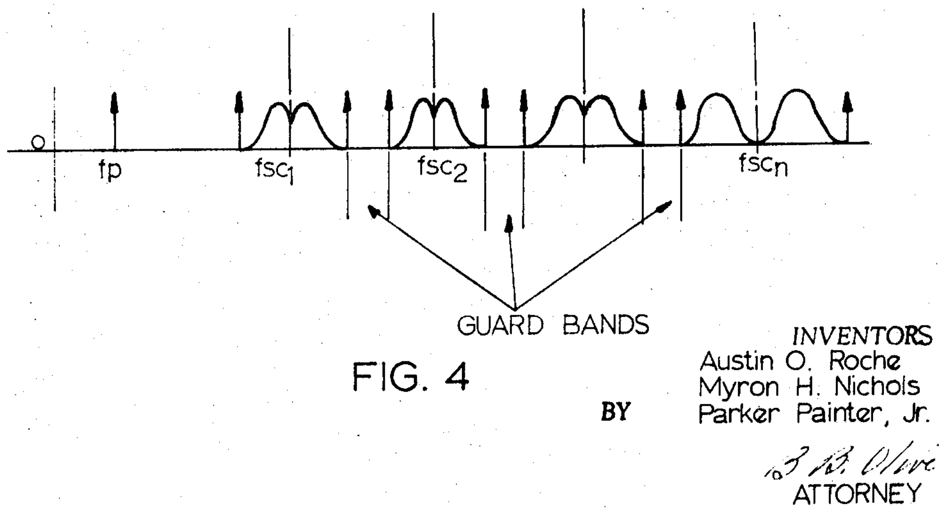
FIG. 4 illustrates the voltage-frequency spectra for a plurality of channel modulator outputs.

In the example illustrated in FIG. 3, there is multiplexing of only two channels whereas in an ordinary system there would of course be multiplexing of many more channels. In any event, using two channels as an example, it should be noted that the frequencies of the subcarrier oscillators 44, 45 are selected so that each subcarrier frequency is separated from each other subcarrier frequency by a guard band to prevent adjacent channel interference. This is illustrated in FIG. 4 where a typical array of spectra for a multichannel system are shown. In FIG. 4, it will be noted, for example, that $f_{sc1}$, $f_{sc2}$ and $f_{scn}$ represent respectively the frequency of subcarrier 1, subcarrier 2 and any subcarrier of $n^{th}$ frequency, $n$ being the highest subcarrier frequency selected depending on the number of channels.

Figure 5:
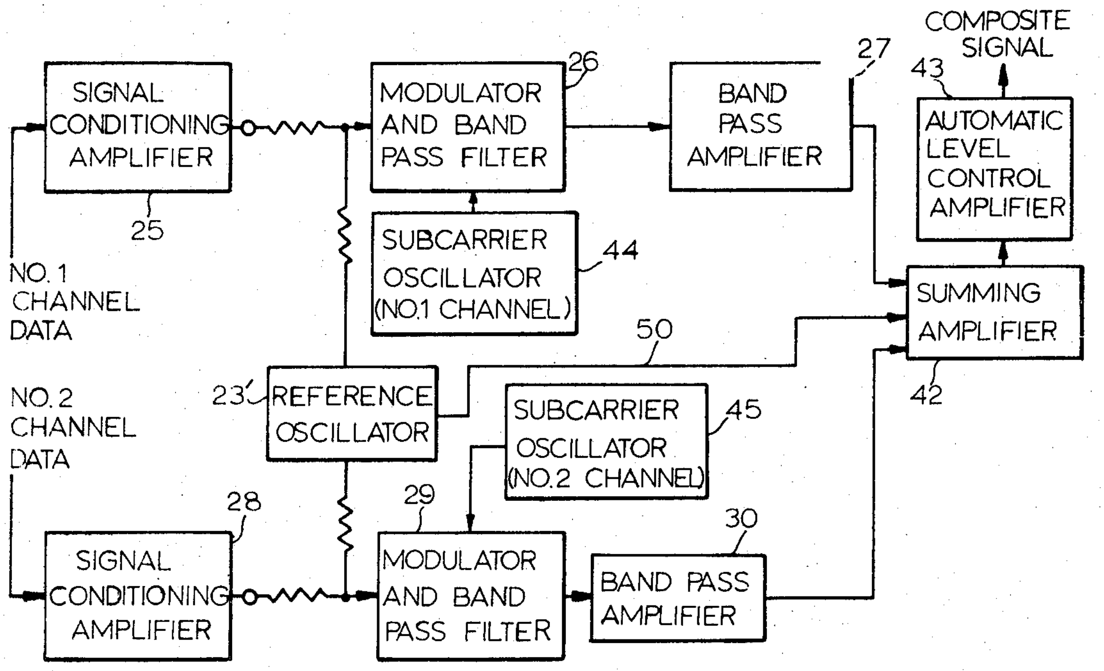
FIG. 5 is a block diagram like FIG. 2 illustrating an alternate connection for the reference oscillator.
Figure 6:
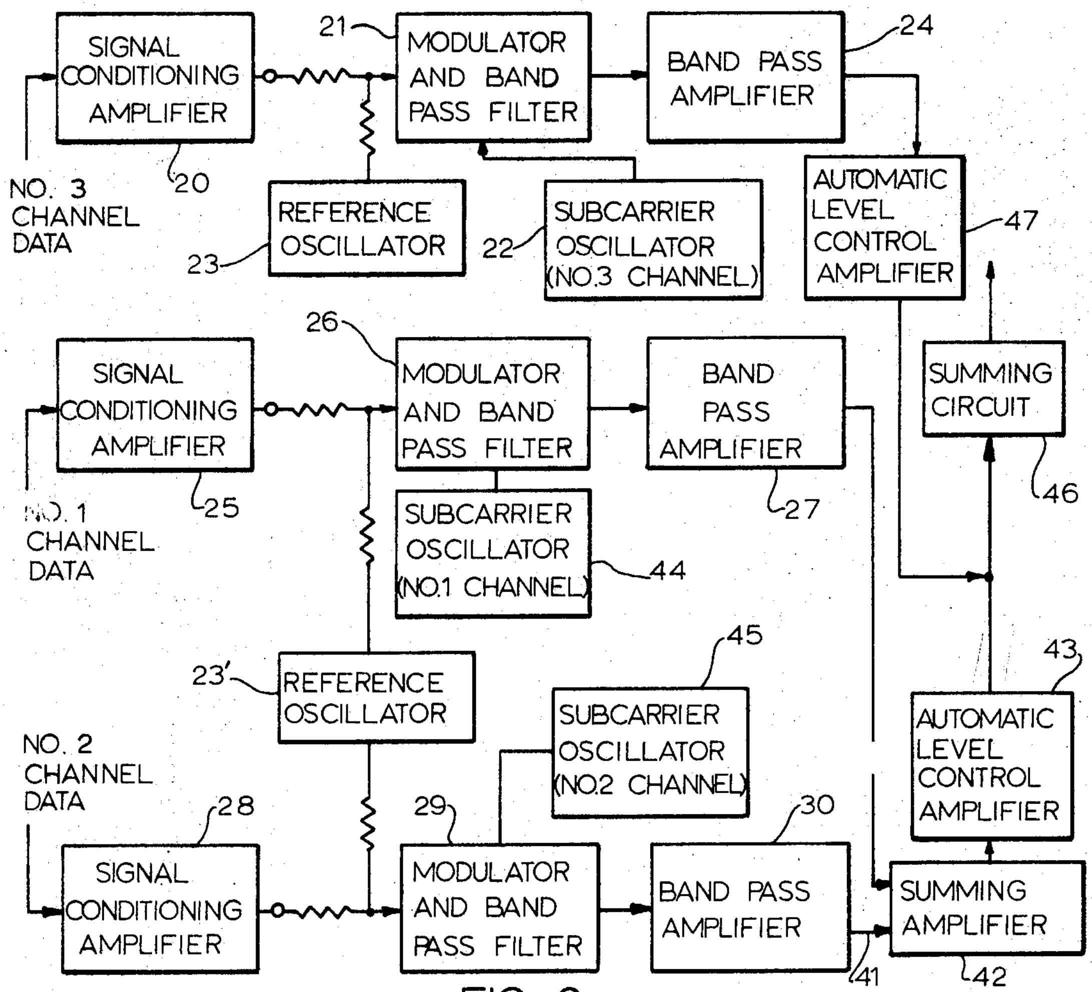
FIG. 6 is a block diagram showing a single transmitting channel connected with a plural group of transmitting channels.

Before proceeding to demodulation, reference will be made to FIGS. 5 and 6. FIG. 5 is like FIG. 3 except that the reference oscillator 23 has an output 50 which feeds the summing amplifier 42 directly which allows preservation of absolute polarity among data signals. FIG. 6 illustrates the flexibility of the invention in adapting to various channel groupings. FIG. 6, as an example, illustrates a combining of a single channel, channel 3, with a group of channels, comprising channels 1 and 2, with the composite group being summed through a summing circuit 46. FIG. 6 will be recognized as a combining of the FIG. 3 circuit with the FIG. 1 circuit applied to an arbitrary No. 3 Channel and with the addition to the FIG. 1 circuit of an automatic-level-control-amplifier 47. Other groupings can of course be realized with appropriate summing circuitry.

Mention will be made at this point of the purposes served by the reference signal modulation in order better to understand the discussion to follow. First, the reference signal modulation provides a predetermined minimum degree of subcarrier modulation at all times regardless of the level or frequency spectrum of the data signal. This assures that the subcarrier phase and frequency recovery system, used in the demodulation process, as later described, remains operational and "in lock" at all times when the signal to noise ratio in the transmission system is adequate to provide usable data. Second, the reference signal modulation resolves the polarity ambiguity of the demodulated data that is introduced by the modulation process. A 180° phase ambiguity is inherent in suppressed carrier modulation and in this regard two means for resolving polarity ambiguity are applicable to the invention, namely, that in which relative polarity reference among data signals is preserved as well as that in which absolute polarity is preserved as mentioned before in connection with FIG. 5. Third, the reference signal modulation provides full end-to-end calibration of level for each subcarrier channel. This third function provides for restoration of the individual subcarrier level change induced by the composite automatic level control prior to transmission. In addition, this third function compensates for drifts in the gain of circuit elements that may be introduced by environmental factors. These three functions will now be explained in connection with the demodulation process.

Figure 7:
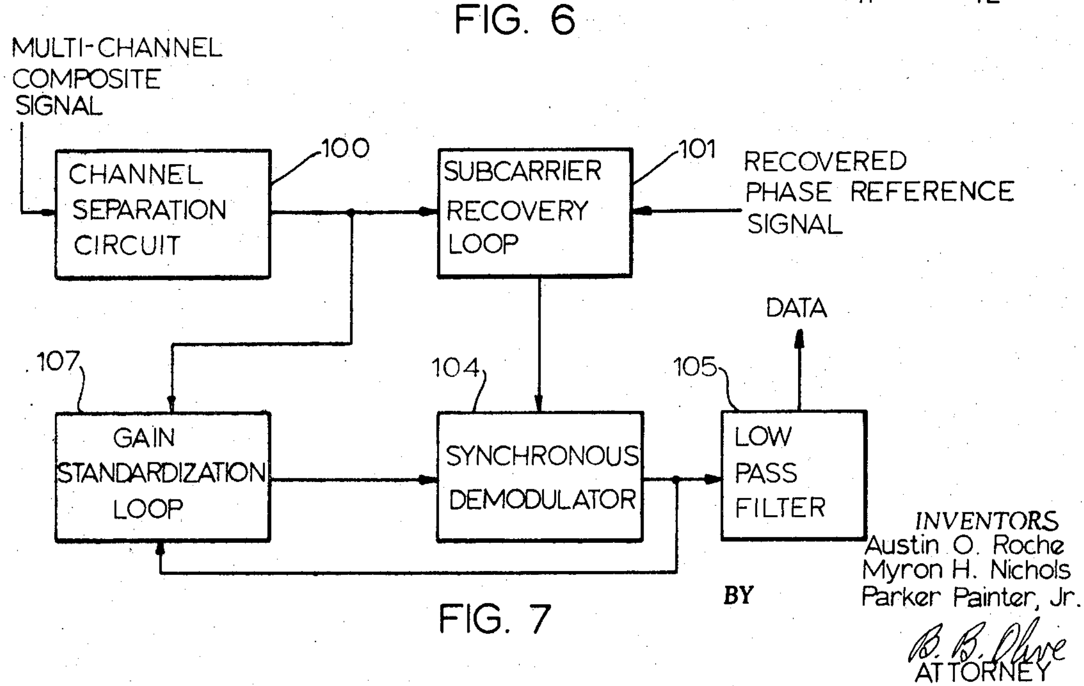
FIG. 7 is a generalized block diagram of a demodulator system.
Figures 8, 9:
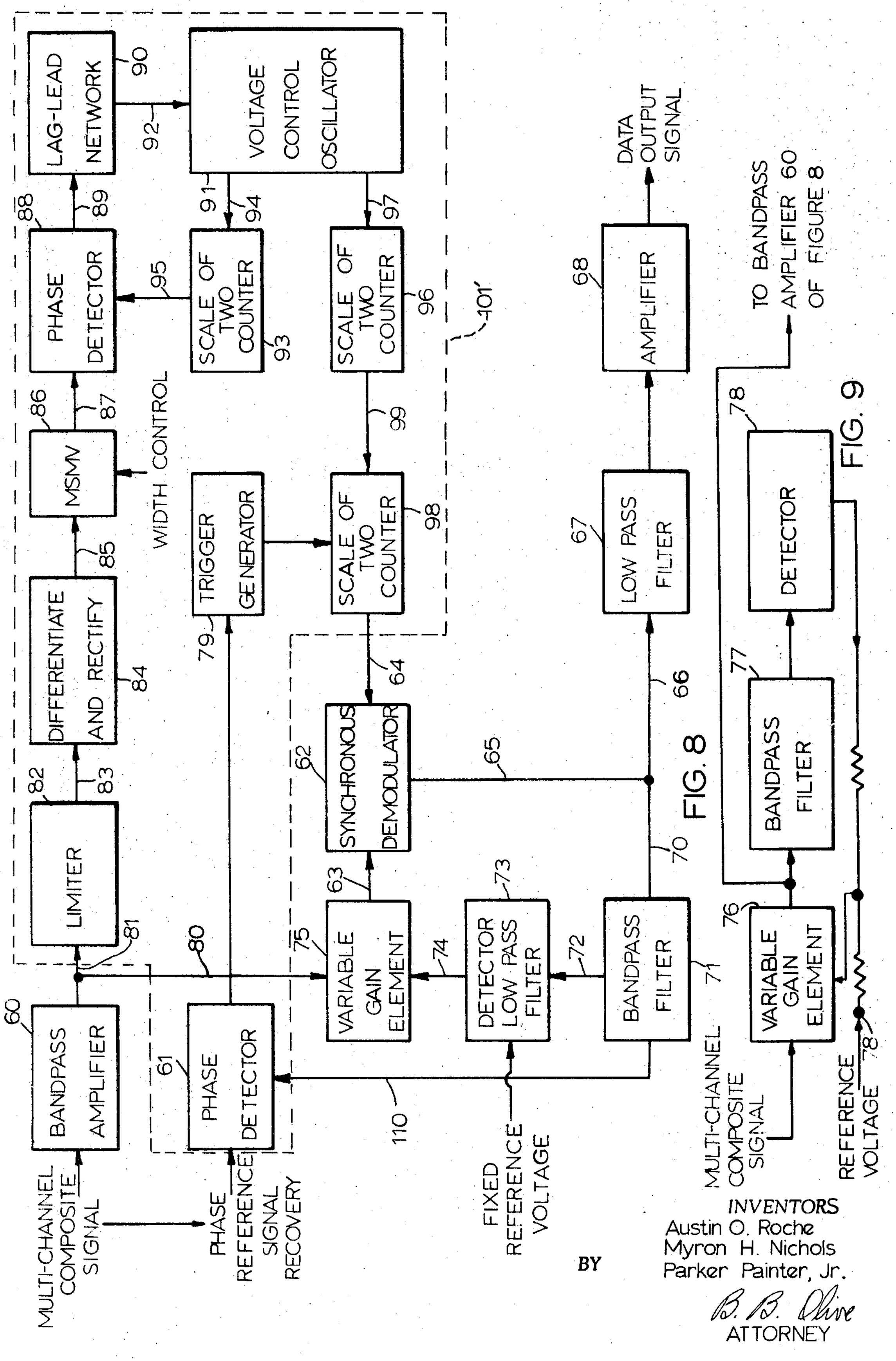
FIG. 8 is a more detailed block diagram of a demodulation system following the generalized diagram of FIG. 7.
FIG. 9 is a block diagram of an alternate preamplification arrangement for FIG. 8.

FIG. 7 is a generalized block diagram and FIG. 8 is a more detailed diagram of demodulation systems used in the invention and designed to select one of the channels, and from the selected channel obtain an output data signal of a characteristic corresponding, particularly in level and polarity, with the data signal introduced at the transmitting end of the same channel. It should be understood that a demodulation system comparable to that represented by FIGS. 7 and 8 is required for each channel so that FIGS. 7 and 8 should be understood as representing single channel demodulation.

Referring to FIG. 7, the multichannel composite signal is first directed through a suitable channel separation circuit 100 whose output is a particular selected channel in which the received subcarrier level is not necessarily at the proper level with respect to the original subcarrier level. The reference phase of the subcarrier signal in the selected channel is restored by recovering the subcarrier frequency and phase which recovering is accomplished by sensing the coherence between signal components that are separated symmetrically above and below the subcarrier frequency as a result of the modulation process. In the generalized diagram of FIG. 7, this involves passing the selected channel signal through a carrier recovery loop 101 to obtain the subcarrier frequency. Phase adjusting of the subcarrier frequency is accomplished in a general sense, and as later described in more detail, by detecting the phase of the reference signal $f_p$ obtained from another channel or from direct reference signal transmission as in FIG. 5 and adjusting the subcarrier frequency phase with the reference signal phase so obtained. The subcarrier frequency in proper phase is thus obtained and enters a synchronous demodulator 104 whose output comprises the data and reference signals.

The synchronous demodulator 104 also receives, from circuit 100, the selected channel signal which is routed through a gain standardization loop 107. Gain standardization loop 107 is controlled by the level of the reference signal $f_p$ from the synchronous demodulator 104 such that the channel signal leaving circuit 104 is at the proper level. To complete the generalized description of FIG. 7, it will be noted that the data signal component $f_d$ coming from the demodulating circuit 104 is selected by low-pass filter 105 which in the final data signal output, as later described in more detail, is corrected both as to level and phase.

FIG. 8 represents a more detailed block diagram following the general format indicated by FIG. 7. In FIG. 8 there are two inputs, namely the transmitted multichannel composite signal which is fed into band-pass amplifier 60 and a phase-reference signal which is fed into a phase detector 61. Depending on the condition of the multichannel signal, a variable-gain amplifier may be employed prior to the band-pass amplifier 60. For example, as illustrated in FIG. 9 the output of a fast-response-variable-gain element 76 may be connected to the band-pass amplifier 60 of FIG. 8. Referring further to FIG. 9, a band-pass filter 77 may receive the composite signal through the mentioned variable-gain element 76 and filter out a directly transmitted reference signal $f_p$ obtained from a FIG. 5-type transmitting circuit. The filtered reference signal $f_p$ is then fed to a detector 78 to develop a varying DC level responsive to variations in the reference signal level and not responsive to the reference signal, per se. This DC level is then compared with a fixed reference voltage applied at point 78 (FIG. 9) and the result of the comparison is applied to the variable-gain element 76 to standardize the level of the composite signal fed to the band-pass amplifier 60 of FIG. 8.

Reference is again made to FIG. 8. With respect to the phase reference signal entering phase detector 61, this signal may be recovered either from another subcarrier demodulator in the manner later described or it may be recovered from a reference signal that has been applied directly to the transmission system prior to transmission. FIG. 5 as previously referred to shows for example a modification of the FIG. 3 arrangement in that the reference oscillator 23′ has an output 50 which feeds the summing amplifier 42 and it is such a directly applied reference signal that can be employed in the circuit of FIG. 8 as a phase reference signal input.

The demodulation circuitry of FIG. 8 acts to recover the data signal and, as previously mentioned, acts to restore the demodulated data level to a specified value and further acts to resolve any polarity ambiguity in the data signal. Selection and demodulation of a channel 1 will be used as an example. Considering first the recovery of the data signal $f_{d1}$, it may be noted that the demodulated data signal is obtained from a balanced demodulator 62 comprising a full-wave synchronous switching circuit which acts to multiply the modulated subcarrier, corrected for level as later discussed and fed to balanced demodulator 62 on input line 63, by a periodic waveform whose frequency equals the subcarrier frequency $f_{sc1}$ and which is fed to the balanced demodulator 62 on input line 64 (representing channel 1 subcarrier in the example chosen). The manner of deriving this waveform is discussed later.

The output line 65 of the balanced demodulator passes two frequencies, namely, the data signal frequency $f_{d1}$ (for channel 1 data) and $f_p$, the reference signal produced by oscillator 23′. (FIG. 5) The term "data signal frequency" should be understood to mean the many frequencies appearing in a typical data signal. Considering only the data signal frequency $f_{d1}$, output line 65 divides into two branches and feeds an input line 66 both the data signal $f_{d1}$ and the reference signal $f_p$ to a low pass filter 67 which separates out and smooths the data signal $f_{d1}$. The data signal frequency $f_{d1}$ is then amplified in a suitable amplifier 68 from which point it may be fed to recording equipment, devices operated by the data signal or the like.

Considering next the aspect of level control, the reference signal $f_p$ which feeds out on line 65 enters a line 70 and a band-pass filter 71 tuned to separate out the reference signal $f_p$ and feed it through a line 72 to a detector and low-pass filter 73 having a connected fixed reference voltage as indicated in FIG. 8 and which is effective to control the overall gain. Detector low pass filter 73 acts to sense the level of the filtered reference signal $f_p$. The output of the detector low pass filter 73 is thus a slowly varying level and this level is arranged through line 74 to control a variable gain element 75. Connected to variable gain element 75 is a line 80 which brings to variable gain element 75 the transmitted signal for channel 1, being used as an example, after it has been separated out and amplified by the band-pass amplifier 60. The level of the signal for channel 1 which reaches the balanced demodulator 62 on line 63 is thus regulated according to the sensed level of the recovered reference signal $f_p$ on line 72.

Considering the function of restoring the demodulated data level further, it may be noted that the operation of the variable gain element 75 in FIG. 8 is opposite to the operation of the automatic level control amplifier 43 in FIG. 3. That is, if the automatic level control amplifier 43 acts to reduce the composite signal level, the variable-gain element 75 in FIG. 8 will act to raise the channel signal level. The channel 1 signal entering the balanced demodulator 62 on line 63 should accordingly be like the channel 1 signal entering the summing amplifier 42 on line 40 in FIG. 3. The desired end result which is obtained by the invention is that the data signal $f_{d1}$ for channel 1 passing on line 65 in FIG. 8 have a direct relation to the data signal $f_{d1}$ for channel 1 passing on line 79 in FIG. 3.

In a multichannel telemetry system incorporating the invention, the circuitry of FIG. 8 is repeated for each channel. Thus, the degree of level control to be applied in the demodulating process may be sensed independently for each subcarrier channel or a group of subcarrier channels by detecting the level of a reference modulating signal as previously explained and using the detected level to restore the demodulated data level to some specified value or to that which it had prior to entering the modulation process.

Attention is next directed to those components in FIG. 8 enclosed by dashed line 101′ generally corresponding to the carrier recovery loop circuit 101 in FIG. 7. In this regard, the selected channel 1 signal being used as an example is fed on line 81 to a limiter 82, then on line 83 to a differentiate-and-rectify circuit 84, then on line 85 to a monostable multivibrator 86, then on line 87 to a "phase-lock" loop which includes a phase detector 88 connected through line 89 to a lag-lead network 90, a voltage controlled oscillator 91 connected to network 90 through line 92 and a scale-of-two counter 93 connected to oscillator 91 through line 94 and having an output line 95 which closes the phase-lock loop. A second scale-of-two counter 96 receives the output of oscillator 91 through a connecting line 97 and directs the scaled down count to a third scale-of-two counter 98 through a connecting line 99.

Considering the various elements 82, 84, 86, 88, 90, 91, 93 and 96 in turn it can be said that the purpose of these elements is to take the selected channel as an input to limiter 82 and derive from this on line 99 a waveform having a fundamental frequency of twice the subcarrier frequency such that it can be counted down by scale-of-two counter 98 to the same frequency as the subcarrier frequency. These same elements, that is elements 82, 84, 86, 88, 90, 91 and 93 are also concerned with recovering the subcarrier reference phase. Considering limiter 82, this circuit can be looked at as a clipper effective to limit the level of the voltage output of band-pass amplifier 60 regardless of subcarrier level. Having obtained such a clipped waveform, it is desirable to filter the frequencies obtained from limiter 82 and to obtain a sharp pulse for triggering the monostable multivibrator 86 at twice the subcarrier frequency. These last purposes are served by the differentiate-and-rectify circuit 84 which acts as a high pass network and a source of sharp triggering pulses at twice the subcarrier frequency.

The triggering pulses entering the monostable network 86 will cause a pulse wave train on line 87 having a fundamental frequency of twice the subcarrier frequency of the channel 1 subcarrier. The mentioned pulse train enters phase detector 88 which is also simultaneously receiving feedback from scale-of-two counter 93. The output of the phase detector 88 on line 89 depends on the input on lines 87 and 95 being of the same frequency and a difference calls for a corrective output to the lead-lag network 90. Network 90 in turn establishes the frequency response of the phase-lock loop and smooths out any high-frequency variations from phase detector 88 and provides an error voltage on line 92 essentially proportional to the phase angle difference between the signal from the monostable multivibrator 86 and the output on line 95. In selecting the frequency response established by network 90, consideration should be given to the band with being narrow enough to eliminate undesirable noise but wide enough to accommodate typical time instabilities that may be produced by elements in the transmission system, particularly in a tape recording system.

Oscillator 91 is an indicated, a voltage controlled oscillator, and it normally operates at some multiple of the subcarrier frequency, the operating frequency being four times the subcarrier frequency for channel 1 in the example illustrated. Under the influence of the described phase-lock control loop, oscillator 91 is locked to a pulse train on line 87 the leading edge of which is generated in coincidence with the time that the subcarrier waveform on line 97 attains its mean value.

Phase lock loops similar in operation to that disclosed herein have been discussed in the literature to which reference is made for further details. Typical discussions are found in "-

Space Communications" edited by A. V. Balakrishman, McGraw-Hill Book Company, Inc. (1963); "Aerospace Telemetry," Harry C. Stiltz, Editor, Prentice-Hall, Inc.

To complete a discussion of the purpose served by the reference signal $f_p$, attention is next directed to phase detector 61 which develops a level adapted to control trigger generator 79. Such level is in turn dependent on the presence or absence of a phase difference between the "phase reference signal" entering phase detector 61 and the recovered reference signal entering phase detector 61 on line 110. As previously mentioned an inherent polarity ambiguity exists in the system being described. Thus, if phase detector 61 detects a phase difference and creates a corresponding control level, trigger generator 79 will become operative and will cause scale-of-two counter 98 to "flip" or "count" out of its normal time cycle so as to correct the polarity of the subcarrier frequency waveform leaving the scale-of-two counter 98 according to any polarity ambiguity detected by phase detector 61. That is, the waveform leaving scale-of-two counter 98 is corrected such that its polarity corresponds to the reference signal polarity in the receiving terminal in the same manner as in the transmitting terminal and this correction is effected by phase detector 61 and trigger generator 79.

In summary, the invention is directed to a multichannel telemetry system utilizing in each channel which follows the invention double-sideband, suppressed carrier and modulated subcarrier and particularly to a system in which the data signal is sometimes discontinuous. At the transmitter, the pilot tone $f_p$, which lies outside of the data signal band is summed with each channel to provide a demodulation reference in absence of adequate data modulation. Automatic level control maintains the sum of the channel signals to the appropriate level and the amount of such level control is sensed at the receiver through recovery of the reference signal from the demodulator signal to provide the described inverse gain control operation. Of further significance where phase ambiguity is of concern, is the transmission of the reference signal in some form which is independently recoverable from the selected channel modulated by the same reference signal. As seen from the previous description the reference signal can, for example, be recovered by direct transmission to give absolute polarity adjustment of the subcarrier wave entering the demodulator or from another channel to give relative polarity adjustment of such wave. It may also be noted in summarizing the invention that at the receiver, the selected channel composite signal once recovered out of the system multichannel composite signal, and after possibly being subjected to the optional fast response gain control loop applied to the system composite signal, is applied to the phase-lock or carrier recovery loop to produce the desired wave of subcarrier frequency entering the demodulator. This loop according to the invention remains "locked" or operational at all times by reason of the signal derived from the pilot tone sidebands. The data signal which is recovered from the demodulator signal is enabled to enter a demodulating process which remains substantially stable and operational at all times thereby providing dependable phase and level correction in the data signal which is recovered out of the demodulator signal. The invention thus meets each of the various objectives previously set forth and functions to give the several advantages described.

While a specific embodiment has been shown and described, it will of course be understood that various modifications may be devised by those skilled in the art and which may embody the principles of the invention and be found to be within the spirit and scope thereof.

We claim:

1. In a multichannel telemetry system utilizing transmitted double-sideband supressed-carrier amplitude-modulated subcarrier signals;

a. a transmitter including:

i. a plurality of sources of continuous subcarrier signals each corresponding to a different channel;

ii. a plurality of sources providing sometime discontinuous data signals each to be transmitted over a different one of said channels to which it corresponds;

iii. at least one source providing a continuous highly stabilized reference signal having a frequency outside the band of said data signals;

iv. a plurality of modulating means each corresponding to a different one of said channels and connected to said subcarrier and data signal sources for the channels to which they correspond each for generating a double-sideband suppressed-carrier transmission signal corresponding to their respective channels;

v. means for combining said double-sideband suppressed-carrier transmission signals generated by said plurality of modulating means into a composite signal;

vi. means for adding an independently recoverable form of said reference signal with said composite signal;

b. a receiver for demodulating said transmission signal including;

i. means operable to independently recover both said composite and independent reference signals;

ii. means for separating said composite signal into double-sideband suppressed-carrier signals each corresponding to a different one of said channels; and iii. a plurality of systems of the following components each corresponding to a different one of said channels for demodulating different ones of said last-named double-sideband suppressed-carrier signals;

1. means responsive to said double-sideband suppressed-carrier signals for generating a waveform of fundamental frequency twice that of one of said subcarrier signals;
2. scaling means connected to said waveform generating means and being productive of a wave having the frequency of said last-named subcarrier signal;
3. demodulating means responsive to said last-named double-sideband suppressed-carrier signal and said wave for generating a demodulated output signal which includes both said data and reference signals for its respective channel;
4. means responsive to said demodulated output signal for recovering said reference signal therefrom;
5. phase detector means responsive to the application of said independently recovered reference signal and said demodulated output signal for developing a control signal which varies in accordance with the difference in phase between said independently recovered and reference signal and said reference signal included in said demodulated output signal;
6. means for applying said control signal to said scaling means for adjusting the phase of said wave; and
7. means connected to said demodulating means and responsive to said demodulated output signal for deriving said data signal for said channel.

2. The telemetry system as set forth in claim 1, in which said means for adding said independently recoverable reference signal comprises means for adding a plurality of double-sideband suppressed-carrier signals which bear demodulating effect of the same said reference signal to form said composite signal such that said reference signal can be independently recovered in said receiver from any of said plurality of double-sideband suppressed-carrier signals.

3. The telemetry system as set forth in claim 1, in which said means for adding said independently recoverable reference signal comprises means for adding to said composite signal a directly transmitted form of said reference signal that can be recovered in said receiver.

4. The telemetry system as set forth in claim 3, including in said receiver in each of said plurality of systems of components, a fast response gain control loop responsive to said directly transmitted reference signal and operative on said composite signal to adjust the level thereof prior to operation of said means for separating said composite signal into separate double-sideband suppressed-carrier signals corresponding to different ones of said channels.

5. In a multichannel telemetry system utilizing double-sideband suppressed-carrier amplitude-modulated subcarrier signals each for a separate one of said channels, which double-sideband suppressed-carrier amplitude-modulated subcarrier signals are combined together to form a composite signal, the combination comprising:

a. a transmitter for each of said channels including:
  i. a first source of continuous subcarrier signals;
  ii. a second modulating source providing a sometime discontinuous data signal;
  iii. a third modulating source providing a continuous highly stabilized reference signal having a frequency outside the band of said data signal;
  iv. modulating means responsive to said subcarrier data and reference signals from said sources for generating a double-sideband suppressed-carrier signal; and
b. means for adding an independently recoverable form of said reference signal with said composite signal;
c. a receiver for demodulating said composite signal including;
  i. means responsive to said composite signal and said independently recoverable reference signal added thereto for recovering said composite signal and independently recoverable reference signal as separate and independent signals;
  ii. said receiver further including for each of said channels;
    1. means responsive to the application of said recovered composite signal for generating a wave having the frequency of different ones of said subcarrier signals;
    2. demodulating means responsive to said recovered composite signal and said wave for generating a demodulator signal which includes both said data and reference signals;
    3. means responsive to said demodulator signal for recovering said reference signal therefrom;
    4. means responsive to said independently recovered and said reference signals recovered from said demodulator signal for developing a control signal which varies in accordance with a difference in phase therebetween and for applying said control signal to said waveform generating means for adjusting the phase of said wave; and
    6. means for generating from said demodulator signal said data signals for said channel.

6. A system for telemetering discontinuous information signals from a transmitting point to a receiving point comprising:

a. a source of continuous reference signals of constant frequency at said transmitting point;
b. means at said transmitting point responsive to said information signals and said reference signals for generating a double-sideband suppressed-carrier signal amplitude-modulated in accordance with both said reference and information signals, said amplitude-modulated signal thereby being a composite signal;
c. means at said receiving point responsive to said composite signal for recovering said suppressed-carrier including an oscillator and means for synchronizing said oscillator at a frequency determined by the repetition rate of said composite amplitude-modulated signal; and
d. synchronous demodulation means at said receiving point responsive to said recovered suppressed-carrier and said amplitude-modulated signal for deriving an output including said information signals and said reference signals.

7. The invention as set forth in claim 6, wherein:

a. means are provided at said transmitting point for transmitting said reference signals independently of said amplitude-modulated carrier;
b. means are provided at said receiving point for recovering said reference signals from said demodulation means output; and
c. means are also provided at said receiving point responsive to the phase difference between said independently transmitted reference signals and said recovered reference signals for correcting the phase of said recovered carrier prior to application thereof to said demodulation means.

8. The invention as set forth in claim 7, wherein: gain control means are provided at said receiving point for applying said amplitude-modulated signal to said synchronous demodulation means, said gain control means being responsive to the difference in amplitude between said recovered reference signal and a fixed reference voltage for adjusting the amplitude of said amplitude-modulated signal prior to its application to said synchronous modulation means.

9. The invention as set forth in claim 6, wherein:

a. said suppressed-carrier recovering means includes:
  i. a phase locked loop including a said oscillator and a phase detector;
  ii. a rectifying and differentiating circuit responsive to said amplitude-modulated signal for deriving a synchronizing signal;
  iii. frequency dividing means in said loop responsive to the output of said oscillator for providing one input to said phase detector; and
  iv. means for also applying said synchronizing signal to said phase detector.

10. The invention as set forth in claim 7, wherein said phase correcting means includes a scale of two counter connected between said oscillator and demodulation means, a phase detector to which said independently transmitted and recovered reference signals are applied, and means for triggering said counter independently of said oscillator when said last-named detector provides an error signal.

11. The invention as set forth in claim 1, wherein said transmitter includes first level control means responsive to the application of said added signals and effective to regulate the level thereof to a substantially constant level for transmission.

12. The invention as set forth in claim 11, wherein said receiver includes second level control means responsive to the amplitude of said demodulator recovered reference signal for controlling the level of said composite signal entering said demodulating means and being operative inverse to that of said first transmitter level control means.

13. The invention as set forth in claim 5, wherein said transmitter further includes first level control means responsive to the application of said added signals and effective to regulate the level thereof to a substantially constant level for transmission.

14. The invention as set forth in claim 5, further including in said receiver second level control means responsive to the amplitude of said demodulator recovered reference signal for controlling the level of said composite signal entering said demodulating means.

15. The invention as set forth in claim 6, wherein:

a. means are provided at said receiving point for recovering said reference signals from said demodulating means output; and
b. means are provided at said receiving point responsive to the relative phase of said recovered reference signals for correcting the phase of said recovered carrier prior to application thereof to said demodulation means.